Jan. 14, 1947.     H. A. ALEXANDERSON ET AL     2,414,219
SEALING UNIT
Filed Nov. 28, 1942      2 Sheets-Sheet 1
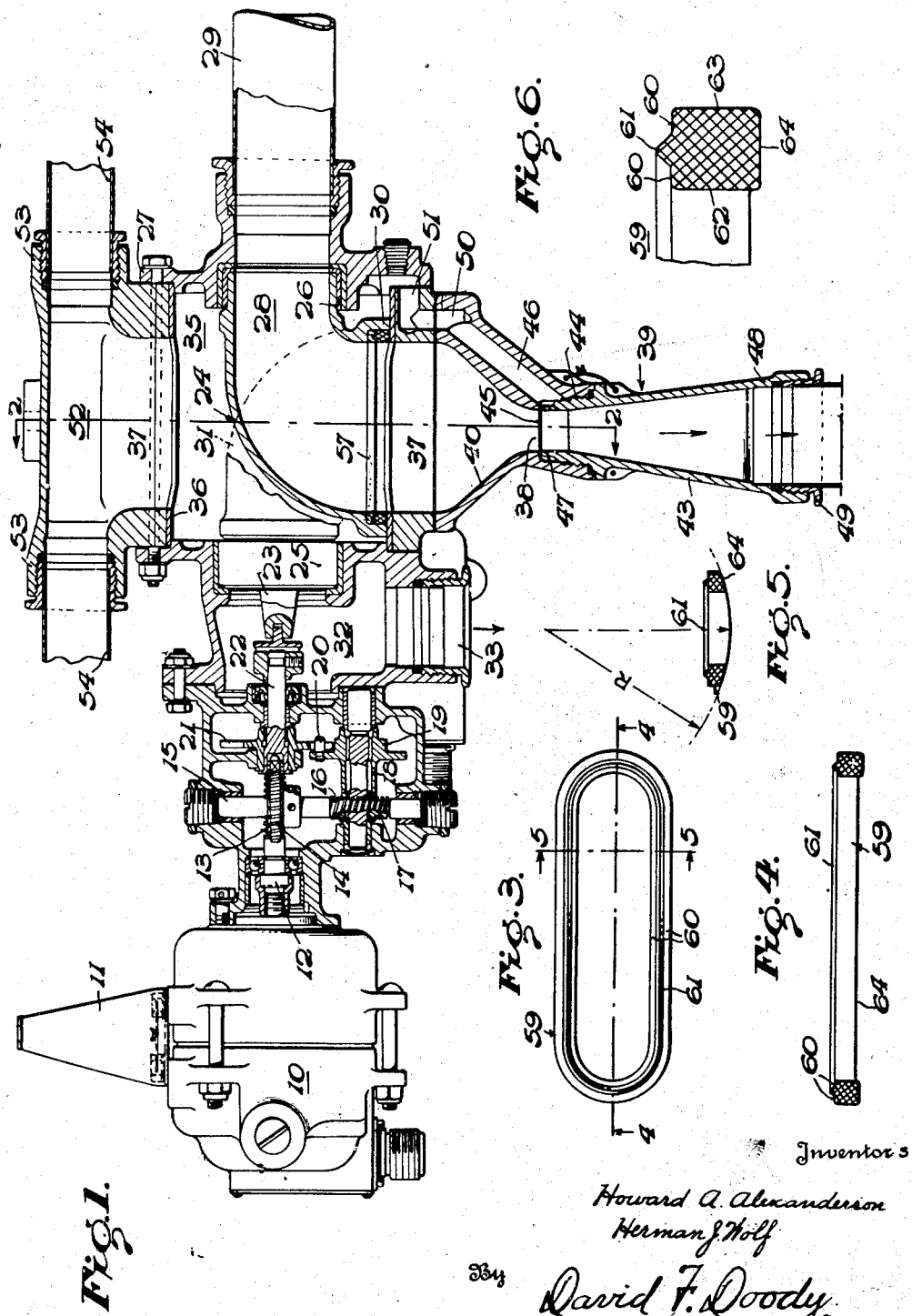
Inventors
Howard A. Alexanderson
Herman J. Wolf
By David F. Doody
Attorney Jan. 14, 1947. H. A. ALEXANDERSON ET AL 2,414,219
SEALING UNIT
Filed Nov. 28, 1942 2 Sheets-Sheet 2
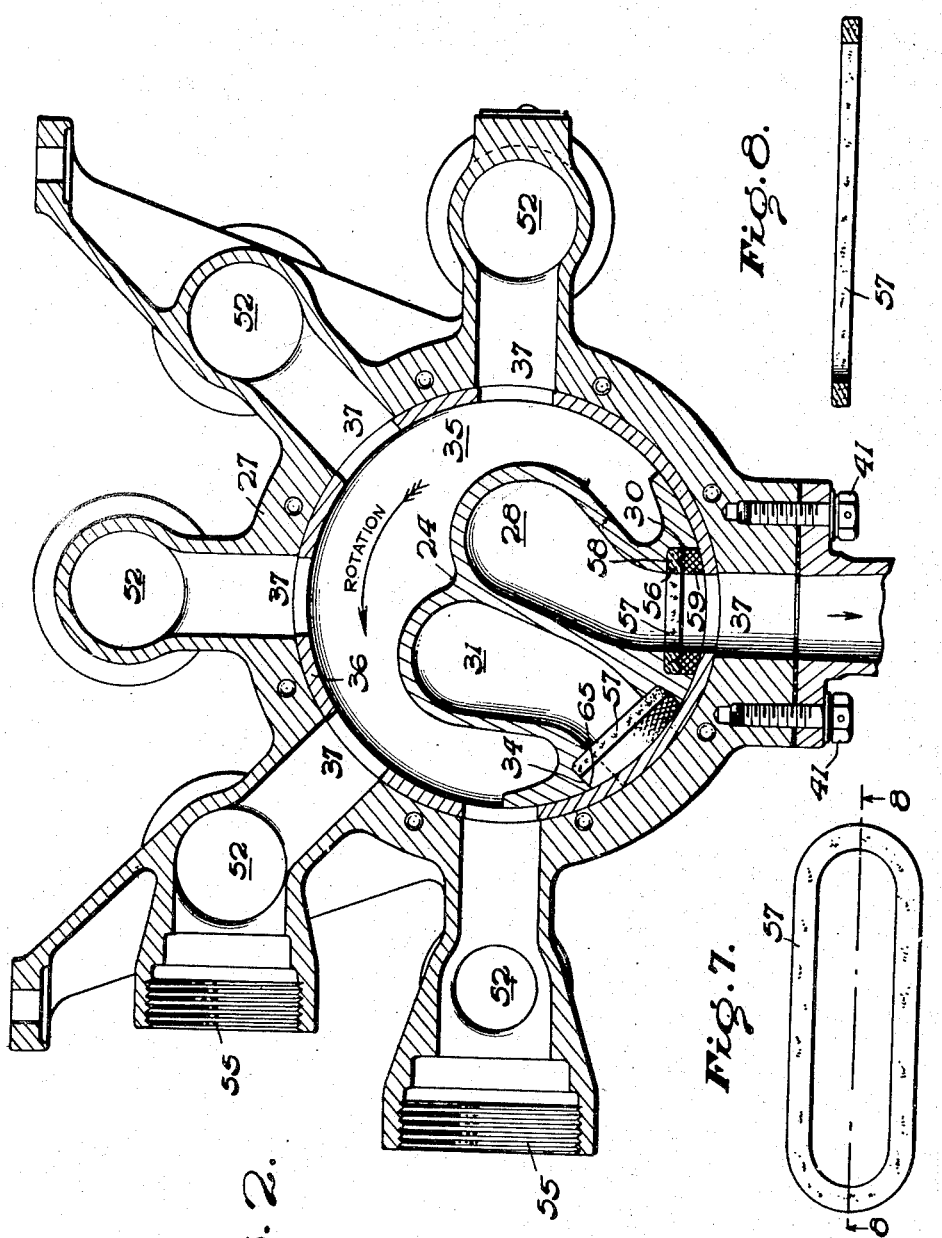
Inventors
Howard A. Alexanderson
Herman J. Wolf
By David F. Doody
Attorney Patented Jan. 14, 1947

2,414,219

UNITED STATES PATENT OFFICE 2,414,219

SEALING UNIT

Howard A. Alexanderson, Woodridge, and Herman J. Wolf, Red Bank, N. J., assignors to Bendix Aviation Corporation, South Bend, Ind., a corporation of Delaware Application November 28, 1942, Serial No. 467,240

2 Claims. (Cl. 251—103)

This invention relates to sealing devices, and particularly to rotary valve seals for air distributing systems.

It is an object of the present invention to provide a valve seal for a rotary distributor that will maintain an effective seal under conditions of misalignment of the distributor.

It is another object of the invention to provide a seal capable of self compensation in use for irregularities encountered in surfaces to be sealed.

Other objects will appear from a study of the following specification when made in conjunction with the attached drawings, throughout which like numerals designate like parts.

Fig. 1 is an elevational and longitudinal, sectional view of an air distributing device employing the sealing unit of the present invention.

Fig. 2 is an enlarged cross-sectional view of the air distributing device and sealing unit taken along the line 2—2 of Fig. 1.

Fig. 3 is a plan view of the seal facing member which is part of the present invention.

Fig. 4 is a longitudinal, sectional view of the facing member taken along the line 4—4 of Fig. 3.

Fig. 5 is a cross-sectional view of the facing member taken along the line 5—5 of Fig. 3.

Fig. 6 is an enlarged, fragmentary, sectional view of the facing member taken from the section of Fig. 4.

Fig. 7 is a plan view of the gasket which is part of the sealing unit of the present invention; and Fig. 8 is a longitudinal, sectional view of the gasket taken along the line 8—8 of Fig. 7.

Figs. 1 and 2 show an air distributing valve of the type used in aircraft in the distribution of air for the inflation of conventional deicer boots.

An electrical motor 10, having a mounting bracket 11, has a shaft 12 connected to a worm 13 of a speed reducing unit including a wheel 14 connected to a stub shaft 15. Shaft 15 carries a second worm 16 which drives a second wheel, shown only partially at 17, for turning the stub shaft 18, which carries a gear 19 and pin 20. Gear 19 and pin 20, together with a star wheel 21, form a conventional Geneva stop mechanism for driving shaft 22 with an intermittent or snap-action motion. Shaft 22 connects to the hub 23 of rotor 24, having end bearing surfaces 25 and 26 carried by the vertical walls of the housing of distributor valve 27. Rotor 24 has two fluid passageways therethrough, 28, which connects to an air supply pipe 29 and terminates in a radially directed mouth 30, and 31, which is similarly shaped, and has one open end in communication with an air chamber 32 and a port 33, and its other end terminating in a radially directed mouth 34. Port 33 is normally connected through a suitable conduit to atmospheric pressure.

Distributor valve 27 includes a valve chamber 35 having a cylindrical liner 36 and a series of angularly disposed and radially directed ports 37 opening into the chamber. The bottom port 37 of Fig. 1 communicates with the throat 38 of a Venturi tube 39 having an upper section 40 secured to housing of valve 27 by studs 41 of Fig. 2, and a lower section 43 secured to the upper section 40 by a screw-threaded union 44. The inner, adjacent surfaces of Venturi sections 40 and 43 are not in contact, but are spaced a slight amount (for example, one one-hundredth of an inch) apart, as represented by the annular slotted aperture 45. This aperture 45 affords direct communication of air between passageway 46 and the throat 38 of venturi 39 by way of the annular chamber 47 formed between the overlapping, but spaced edges of sections 40 and 43. Passageway 46 opens into valve chamber 35 by way of the rectangularly disposed bores 50 and 51.

Venturi 39 terminates in a conduit portion having a conventional coupling gland 49 for connecting the venturi to the atmosphere at a point of low pressure on an airplane, for example, a trailing wing surface.

All ports 37, other than the bottom port, open into transversely extending air passageways 52 having oppositely disposed and aligned conduit couplings 53 connected to conduits 54 which connect with the conventional deicer boots carried by an aircraft. As shown in Fig. 2, two additional screw-threaded conduit couplings or terminals 55 are made integral with housing of distributor 27 and afford communication with two of the transverse passageways 52. Terminals 55 may be connected to conduits leading to boots on the rudder post and stabilizers of the craft.

In order to prevent leakage of air under pressure from passageway 28 to chamber 35 in the process of distribution of air to ports 37, a novel sealing unit is provided. Mouth 30 of rotor 24 is provided with a recess or rabbet 56 containing a gasket member 57 of sponge rubber or sponge "neoprene" cemented to the bottom of recess 56 along the surface 58. A suitable cement is known in the trade as "Fairprene." Gasket 57 is dimensioned to fit within recess 56 with its inner periphery flush with the inner surface of passageway 28. In one embodiment of the invention, the overall extent of gasket 57 was made three inches, the overall width one inch, with a rectangular cross-section of three-sixteenths by three thirty-seconds inches.

Between gasket 57 and the inner surface of liner 36, a seal facing member 59 is confined within rabbet 56. This facing member, which is composed of a hard, rigid material, such as carbon, is moulded in the shape shown in detail in Figs. 3–6, and when projected in plan, its outlines, as shown in Fig. 3, coincide with the outlines of gasket 57 as shown in Fig. 7. Facing member 59 is formed with an inner, or gasket-engaging surface including flat shoulder portions 60, and an angular ridge 61 projecting between shoulder portion 60. Member 59 has inner and outer wall portions 62 and 63, respectively, extending rectangularly from shoulder portions 60, and terminating in an arcuately shaped sealing surface 64.

Surface 64 is curved at a radius R as indicated in Fig. 5, which radius is equal to the radius of the inner surface of liner 36, so that surface 64 and the surface of liner 36 will have equal curvature. The sealing member 59 used with the gasket 57, the measurements of which are noted above, has a radius of one and five-eighths inches to mate with surface of liner 36 having the same radius.

The sealing member 59, when in position, as shown in Figs. 1 and 2, compresses gasket 57, with the result that ridge 61 is embedded into gasket 57 in a gas-tight relation, thus preventing air under pressure in passageway 28 from being diverted or by-passed between the contacting surfaces of gasket 57 and facing member 59. The compression of gasket 57 by facing member 59 is not total, and further compression is permissible and is intended for the proper functioning of the novel sealing unit of the present invention.

A similar sealing unit, including a gasket 57 and a facing member 59, is arranged within a rabbet 65 formed in the mouth 34 of passageway 31. It is believed unnecessary to further describe this latter sealing unit, since it is identical to that in rabbet 56.

The novel sealing unit above described is particularly adapted for use in an air distributor of the type represented by 27. In aircraft deicing systems, air may be distributed cyclically to a whole series of rubber boot elements, and it is also, after inflation of a particular boot, dumped overboard to the atmosphere, and then placed under suction until reinflated. Air under pressure enters passageway 28, and when this passageway communicates with bottom port 37, as shown in Figs. 1 and 2, the air is vented to the exterior through Venturi tube 39, and the flow creates a suction through passageway 46 and chamber 35, placing all boot elements at suction pressure.

As rotor 24 is driven by motor 10, passageway 28, as well as passageway 31, is rotated with a snap-action, by virtue of the Geneva motion 20, 21 to each of the ports 37, and will dwell thereat for a determined inflating interval. Irregularities in the cylindrical surface of liner 36, misalignment or lack of precise coaxiality between rotor 24 and liner 36 and small irregularity in the fit between mouth 30 (as well as mouth 34) and liner 36, all tend to permit leakage between chamber 35 and passageways 28 and 31, but the novel sealing unit is self-compensating for misalignment and surface irregularities, since the sponge rubber gasket permits angling of sealing member 59 without loss of pressure between the gasket and the member. The carbon member 59 has low frictional drag on liner 36, and having an arcuate sealing face, it conforms so closely to the curvature of liner 36 as to give a true line, rather than point seal between the passageway 28 (or 31) and chamber 35.

While only one embodiment of the present invention has been shown in the drawings, it is to be understood that various changes may be made without departing from the scope of the present invention. For this reason, it is intended not to limit the invention by the description herein given as an example, but solely by the scope of the appended claims.

What is claimed is:

1. In combination with a cylindrical chamber having an inner wall and a series of angularly disposed fluid ports opening thereinto; a rotary valve member mounted for rotation axially within said chamber and having a fluid passageway, said member having a radially projecting portion terminating in an aperture mouth affording communication with said passageway, said projecting portion being formed with a complementally curved face for frictional engagement with said cylindrical wall, said face being provided with a recess adjacent the apertured mouth in encircling relation thereto; and sealing means in said recess, said sealing means including an annular shape inner cushion member of sponge-like resilient material cemented in said recess, and a complementally shaped outer solid carbon facing member in said recess between said cushion member and said inner wall, said facing member having on one side a continuous integral tapered projection embedded in said cushion member and its opposite side being formed with a curved face of the same radius as the face on said projecting portion in resilient engagement with said inner wall.

2. In combination with a cylindrical chamber having an inner wall and a series of angularly disposed fluid ports opening thereinto; a rotary valve member mounted for rotation axially within said chamber and having a fluid passageway, said member having a radially projecting portion terminating in an apertured mouth affording communication with said passageway, said projecting portion being formed with a complementally curved face for frictional engagement with said cylindrical wall, said face being provided with a recess adjacent the apertured mouth in encircling relation thereto; and sealing means in said recess, said sealing means including an annular shape inner cushion member of sponge-like resilient material cemented in said recess, and a complementally shaped outer solid carbon facing member in said recess between said cushion member and said inner wall, said facing member having on one side a continuous angular projection embedded in said inner cushion member and integral laterally projecting walls at the base of said angular projection for limiting the penetration of the latter, said facing member being formed on its side opposite the angular projection with a curved face of the same radius as the face on said projecting portion and resiliently engaging said inner wall.

HOWARD A. ALEXANDERSON.
HERMAN J. WOLF.